United States Patent [19]

Gerhard et al.

[11] 4,168,453
[45] Sep. 18, 1979

[54] VARIABLE INTENSITY CONTROL APPARATUS FOR OPERATING A GAS DISCHARGE LAMP

[75] Inventors: Francis H. Gerhard; Gerald A. Felper, both of Anaheim, Calif.

[73] Assignee: Datapower, Inc., Santa Ana, Calif.

[21] Appl. No.: 865,209

[22] Filed: Dec. 28, 1977

[51] Int. Cl.² .................. H05B 37/02; H05B 39/04; H05B 41/36
[52] U.S. Cl. .................................. 315/225; 315/291; 315/362; 315/DIG. 7
[58] Field of Search .................. 315/41, 62, 72, 209 T, 315/225, 291, 313, 362, DIG. 4, DIG. 5, DIG. 7, 208, 224, 283, 307; 307/131; 328/69; 323/4 C

[56] References Cited

U.S. PATENT DOCUMENTS

| | | | |
|---|---|---|---|
| 3,486,070 | 12/1969 | Engel | 315/224 |
| 3,906,302 | 9/1975 | Wijsboom | 315/209 R |

Primary Examiner—Alfred E. Smith
Assistant Examiner—Robert E. Wise
Attorney, Agent, or Firm—Knobbe, Martens, Olson, Hubbard & Bear

[57] ABSTRACT

A gas discharge lamp is connected in parallel with an inductor and in series with a solid state switching device and a resistor, and this combination is connected across a DC voltage. This switching device is controlled by a monostable multivibrator, the input of which is connected to the output of a comparator amplifier sensing the difference between the voltage drop across the above mentioned resistor and the voltage of a variable reference voltage source.

When the current through the inductor has increased to a point where the voltage drop across the resistor exceeds the voltage of the reference source, the comparator amplifier triggers the monostable multivibrator causing the solid state switching device to be turned off. This acts to collapse the magnetic field in the inductor thereby causing a large voltage to appear across the gas discharge lamp sufficient to light the lamp. At the end of the predetermined time period of the low output state of the monostable multivibrator, its output turns the solid state switching device on, allowing current to flow once again from the power supply through both the inductor and the lamp. The current flow through the lamp when the solid state switching device is on is in the opposite direction from the current flowing through the lamp when the solid state switching device is off. Thus, the lamp current is an alternating current. The intensity of the lamp is varied by varying the level of the reference voltage supplied to the comparator amplifier.

30 Claims, 9 Drawing Figures

VARIABLE INTENSITY CONTROL APPARATUS FOR OPERATING A GAS DISCHARGE LAMP

BACKGROUND OF THE INVENTION

1. Field of the Invention

This invention relates to apparatus for operating a gas discharge lamp, such as a fluorescent, a mercury vapor lamp, a sodium lamp, or a metal halide lamp.

2. Description of the Prior Art

Control circuits for gas discharge lamps are known which obviate the need for the usual heavy and expensive series ballast devices, corresponding to the inductor in this device. In such circuits, switching elements are provided to periodically switch the direction of current through the lamp to reduce the deterioration or errosion of electrodes, and to ensure a high enough frequency of switching to reduce the requirement for the size of the ballast. Such circuits generally require two switching elements for each direction of the current.

Attempts have been made to fabricate the same type of circuit using only a single switching element to cause current reversal on the lamp. For example, the U.S. patent to D. B. Wijsboom, U.S. Pat. No. 3,906,302, is directed to such an arrangement and incorporates an inductor in parallel with the lamp, which lamp is in series with a switching device. Such a switching device is generally operated at relatively high frequencies, such as 20 kHz. A significant disadvantage of this prior art device is that its control circuitry does not provide for varying the intensity of the lamp.

SUMMARY OF THE INVENTION

A gas discharge lamp and an inductor or choke coil are connected in parallel with one another. One side is connected to a power source and the other side is connected to the collector of a transistor switch. The emitter of the transistor is connected to one end of a resistor, and the other end of the resistor is connected to ground. The base of the transistor is connected to the output of a monostable or one-shot multivibrator. The input to the one-shot multivibrator is connected to the output of a comparator amplifier. The multivibrator operates in such a way that when the input to the multivibrator is high, the multivibrator is triggered and its output goes low for a predetermined amount of time, after which its output returns to the high state. The two inputs to the comparator amplifier are connected in such a way that one input is connected to the emitter of the transistor and the other input is connected to a selectively variable reference voltage source. The circuit components and the time delay of the multivibrator are chosen in such a way as to provide a relatively high rate of switching on the base of the transistor, approximately 20 to 40 kHz.

The alternating current flowing through the gas discharge lamp has no direct current component. As a result, the useful life of the lamp is increased by maximizing the life of the electrodes since a direct current component of lamp current causes excessive cathodic heating of one of the two electrodes and reduces the life of that electrode.

A significant feature of this invention is that the intensity of the lamp may be varied by varying the reference voltage at the input of the comparator amplifier. In one embodiment, this function is provided by a potentiometer connected between the reference voltage and the input to the comparator amplifier. In another embodiment, a photo conductive resistor is used in the voltage dividing input circuit to the comparator amplifier to automatically vary the intensity of the gas discharge lamp in response to the ambient light intensity.

A further aspect of this invention features the use of multiple lamps, instead of just one gas discharge lamp with no increase in the ignition voltage of the circuit. In order to ignite such lamps in sequence, for example in the case of two lamps, a capacitor is connected in parallel with one of the lamps. This capacitance acts to short out one lamp while the first lamp is ignited. After the first lamp is ignited, all of the ignition voltage supplied by the coil will appear across the second lamp, and cause the second lamp to ignite. After the second lamp is ignited, the capacitor has a comparatively high impedance, and is therefore effectively out of the circuit.

Another feature of this invention features the use of a Zener diode, metal oxide varistor, or similar device connected across the transistor collector and ground. This varistor protects the transistor from transient surges in electrical power in the circuit by shorting out any transient voltages which exceed the magnitude of the breakdown voltage of the varistor.

In an additional embodiment of this invention, a low voltage power supply suitable for powering the one shot multivibrator and comparator amplifier as well as supplying the reference voltage to the input of the comparator amplifier is supplied by a step-down transformer having as its primary winding the choke coil connected in parallel with the gas discharge lamp. According to this aspect of the invention a diode is connected between the secondary winding and a capacitor. The low side of the secondary winding and the other side of the capacitor are connected to ground. The polarity of this diode is such that the voltage supplied to the capacitor is independent of the transient voltage which occurs in the inductor during periods when the transistor is turned off.

According to a further aspect of this latter embodiment, the electrodes of the gas discharge tube are preheated prior to ignition, thereby extending the usable life of the gas discharge tube. This is accomplished by connecting one of the lamp electrodes across a minor portion of the high side of the choke winding. The other electrode is connected across a minor portion of the low side of the choke winding. This will ensure that a small current flows through both electrodes just before the lamp is ignited, allowing the electrodes to warm up to a temperature closer to the temperature achieved after ignition of the lamp.

BRIEF DESCRIPTION OF THE DRAWINGS

The invention will be described in detail with reference to the accompanying drawings in which:

FIG. 3 shows four waveform plots labeled 3A, 3B, 3C, and 3D which are characteristic of the control circuit illustrated in FIG. 1.

FIG. 5 also illustrates the use of the primary coil as an auto transformer to supply current to the electrodes of the gas discharge lamp as a source of preheating current prior to ignition of the lamp.

DESCRIPTION OF THE PREFERRED EMBODIMENT

Figure 1:
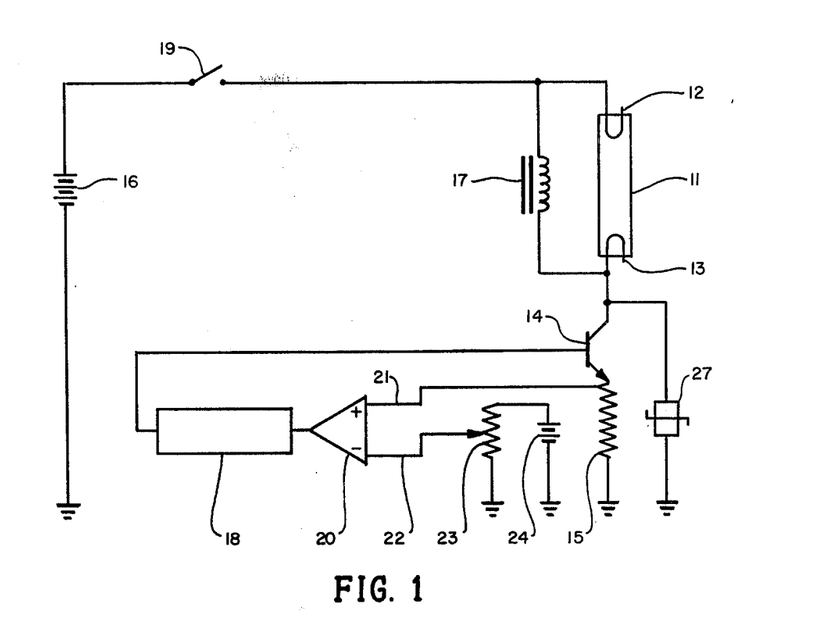
FIG. 1 illustrates a preferred embodiment of a control circuit for a gas discharge lamp shown in simplified form for facilitating an understanding of the overall function of the control apparatus.

Referring to the circuit illustrated in FIG. 1, a gas discharge lamp 11, typically a low-pressure mercury vapor fluorescent lamp, having two electrodes 12 and 13, has its electrode 13 connected to an electronic switch shown as an NPN transistor 14, the collector of which is connected to electrode 13, and the emitter connected to a resistor 15. The other end of the resistor 15 is connected to ground. The other electrode of the gas discharge tube 12 is connected to a DC power supply. This supply will normally be a rectified AC source but is shown for simplicity in this figure as a battery 16 whose positive terminal is connected through on-off switch 19 to electrode 12 and whose negative terminal is connected to ground. A choke or inductor 17 is connected in parallel with the electrodes of the gas discharge lamp 12 and 13.

The base of the NPN transistor switch 14 is connected to the output of a one-shot multivibrator 18. The monostable multivibrator operates in such a way that when the input to the ultivibrator is low its output is high, and when its input is high, the monostable multivibrator is triggered such that its output goes into the low state for a predetermined finite length of time, after which the output of the multivibrator returns to the high state. The input of the multivibrator is connected to the output of a comparator amplifier 20. The positive input of the comparator amplifier is connected through a conductor 21 to the emitter of the NPN transistor 14, and the negative input of the comparator amplifier is connected through a conductor 22 to a potentiometer 23. Potentiometer 23 is connected to the positive end of a DC power source 24, and the negative end of the DC power source 24 is connected to ground.

The operation of the circuit of FIG. 1 is as follows. When the switch 19 is first closed, the current passes through the switch 19 and through the inductor 17. No current passes through the gas discharge lamp 11 because, until it is ignited by high voltage, the lamp remains nonconductive. The current through the inductor passes through the NPN transistor switch 14 and through the resistor 15 to ground. The current through the inductor 17 rises as a function of time until it reaches a level at which the voltage drop across the resistor 15 exceeds the voltage on the conductor 22. The voltage on the conductor 22 is determined by the potentiometer 23. When the voltage drop across the resistor 15 exceeds the voltage on the conductor 22, the comparator amplifier 20 senses a positive difference between its inputs and the output of the comparator amplifier 20 changes from the low to the high state. In response to the high output of the comparator amplifier 20, the one-shot multivibrator 18, is triggered and provides a low output for a short predetermined length of time. Thus, the transistor switch 14 will be turned off for the short period of time during which the base of the transistor received a low level signal from the multivibrator 18. The magnetic field in the choke 17 then collapses, resulting in a voltage potential across the electrodes 12 and 13 of the gas discharge lamp 11. This potential is sufficient to ignite the lamp and the lamp begins to conduct current.

After the above-mentioned short predetermined length of time, the one-shot multivibrator output returns to its normally high level state, thereby turning the transistor switch 14 back on. At this instant in time, current begins to flow from the source 16 through the electrodes 12 and 13 of the gas discharge lamp 11 in the opposite direction to the current supplied before by the choke 17. The magnetic field in the choke 17 also begins to build up again as does the current through the choke 17. This results in a rise in the collector current of the transistor 14 and an equal rise in current through the resistor 15. This rise in current will cause the voltage drop across resistor 15 to rise until the conductor 21 again exceeds the voltage on conductor 22. Again, the comparator amplifier 20 will give a high output when this condition is reached, causing the output of the multivibrator 18 to go into the low state for the finite period of time thereby turning off the collector current of the transistor 14. The magnetic field in the choke 17 will collapse at this time, thereby causing a current to flow between the electrodes 12 and 13 of the gas discharge lamp 11 in a direction opposite to the direction traveled by the current when the transistor 14 was on. This condition will continue until the multivibrator output returns automatically to the high state.

As may be seen from this description, this process will continue to repeat itself as the transistor 14 continuously is switched on and off until steady state conditions are achieved. One or more cycles of operation may be required to ionize the lamp and cause it to ignite.

A varistor or high voltage zener diode 27 is connected between the collector of the NPN transistor and ground, and serves to protect the transistor 14 from destructive breakdown in the event of lamp failure causing an open circuit between its terminals, or inadvertent unplugging of the lamp when the power switch 19 is closed. When the lamp itself is defective and causes an open circuit or when the lamp is removed, the voltage rise at the collector of transistor 14 produced by collapse of the magentic field in the inductor 17 will be limited to the breakdown voltage of the varistor, a value selected to be within the safe limits of the collector-base junction of the transistor switch 14.

A significant feature of the invention is that the varistor 27 serves the additional function of preventing ignition of the lamp until the lamp electrodes have been warmed up over a time period which is long compared to the operating period of the control circuit. Thus, the control circuits of this invention, without the varistor, would typically supply on the order of 1000 volts across the lamp in the fly back mode. Such high voltage applied to the lamp filaments when they are cold would be extremely deleterious since the electrodes would undergo a very high rate of change of temperature. The varistor is selected such that it breaks down for voltages exceeding 500 to 600 volts. At these lower voltages, the lamp 11 will not ignite until after the cathodes have been heated. Typically, a time delay of ¾ second to one second is the amount of time needed to heat up the cathodes sufficiently for the lamp to ignite when supplied with 500 to 600 volts.

FIGS. 3A, 3B, 3C, and 3D are plots of the steady state response characteristics of the circuit for two different levels of input power to the gas discharge lamp.

Figure 3A:
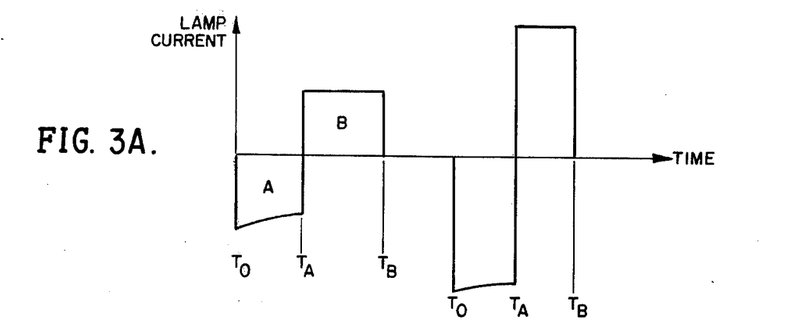
FIG. 3A is a plot of the current through the gas discharge lamp as a function of time.

FIG. 3A is a plot of a single cycle of current through the gas discharge lamp as a function of time. The current is plotted on the vertical axis and the time is plotted on the horizontal axis. It will be understood that the current alternates through the lamp in a repetitive cycle. In the region of FIG. 3A, denoted "A", the transistor switch 14 is in the off state and the collapsing field in the inductor 17 is forcing a current through the gas discharge lamp. The region A covers a period of time between time $T_O$ and time $T_A$. This time period is equal to the unstable period of multivibrator 18. In the region in FIG. 3A denoted "B", the transistor switch 14 is on. The region B lies between the time $T_A$ and the time $T_B$, after which the cycle repeats itself.

In FIG. 3A, the magnitude of the lamp current in region A is shown to be roughly equal to the magnitude of the current in region B. Since, for reasons described above, there is no net DC current through the lamp, the respective areas under the curves in regions A and B are equal. Thus, in the circuit operating mode illustrated by FIG. 3A, the duration of the time periods A and B are roughly equal. The operational mode shown in FIG. 3A having approximately equal current flows in regions A and B is advantageous since it maximizes the efficiency of the lamp and also minimizes the current handling requirements for the switch transistor 14. This operating mode is achieved for a fairly narrow range of DC voltage ouput of the power source 16 for a given lamp. The circuit of FIG. 6 described below provides a means for matching a given DC voltage to a plurality of lamp or lamps having different optimum voltages.

Figure 3B:
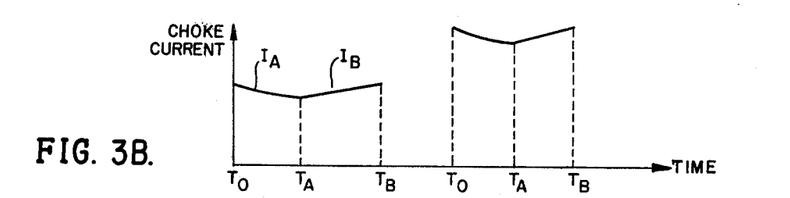
FIG. 3B is a plot of the current through the choke or inductor as a function of time.

FIG. 3B is a plot of the current through the choke or inductor 17 as a function of time. The current through the choke is plotted on the vertical axis, while time is plotted on the horizontal axis. In the region of FIG. 3B denoted "A", at time $T_O$ the transistor has been turned off and the current through the choke is decaying as a function of time until time $T_A$. At time $T_A$, the transistor is turned on. The current through the choke in the region of FIG. 3B denoted "B" increases until time $T_B$, at which time the transistor is turned back off, and the cycle repeats itself. The behavior of the circuit thus alternates between the behavior plotted in region A and the behavior plotted in region B.

Figure 3C:
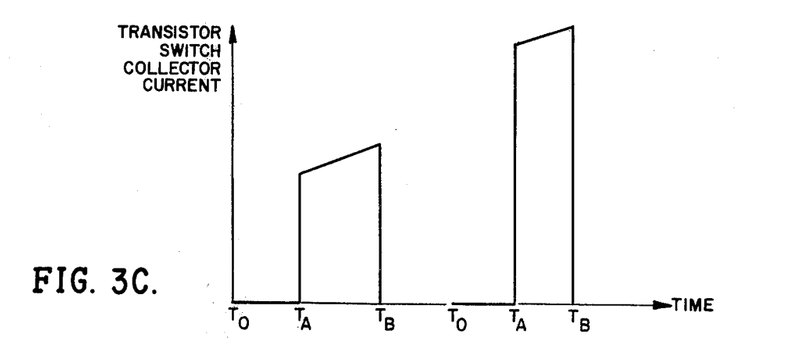
FIG. 3C is a plot of the collector current of the transistor as a function of time.

FIG. 3C is the plot of the collector current of the transistor plotted as a function of time. The collector current amplitude is plotted on the vertical axis and time is plotted on the horizontal axis. In the region denoted A of FIG. 3C, the transistor is off and therefore the collector current remains zero, from time $T_O$ to the end of region A at time $T_A$. In the region denoted B in FIG. 3C, at time $T_A$ the transistor is turned on and remains on until time $T_B$, which defines the end of region B. During this time, the collector current continually increases. At time $T_B$ the transistor is again turned off and the process repeats itself. Thus, the collector current is periodic in time. The current level indicated by the plot is equal to the voltage on the conductor 22 of FIG. 1 divided by the resistance of the resistor 15 in FIG. 1.

Figure 3D:
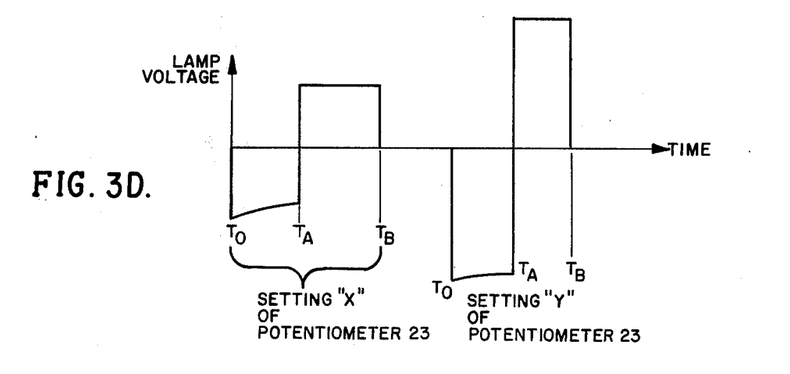
FIG. 3D is a plot of the voltage across the gas discharge lamp as a function of time. In all of these plots, time is plotted on the horizontal axis and the voltage or current is plotted on the vertical axis.

FIG. 3D is a plot of the voltage across the gas discharge lamp as a function of time. It is identical in shape to the lamp current shown in FIG. 3A at the operating frequency of the circuit, i.e. the frequency at which the transistor switch 14 is switched on and off. This frequency is chosen so that its period is short compared to the ionization time of the lamp. A representative operating range is from between 20 to 40 kHz. At this high frequency, the lamp appears electrically to be a resistor. Since the current through a resistor is linearly proportioned to the voltage across it, the lamp voltage and current wave forms are identical in shape.

This high frequency operation has the significant advantage that the weight of the choke, shown in FIG. 1 as 17, may be considerably reduced below the weight of the typical chokes found in the usual fluorescent lamp circuits using 60 Hz AC sources. By way of specific example, a choke suitable for use at 20 kHz will weigh on the order of 4 or 5 ounces whereas the corresponding choke for use at 60 Hz will weigh 4 or 5 pounds.

A significant feature of the invention is the selectively variable control over lamp intensity which potentiometer 23 provides. The power input to the lamp (and the resultant lamp intensity) is approximately proportional to the average magnitude of the lamp current, which is plotted in FIG. 3A. This plot shows the current reversal during periods when the transistor is turned off, which occurs, for example, at time $T_B$.

Assume that at a particular setting "X" of the potentiometer 23 in FIG. 1, the voltage on conductor 22 in FIG. 1 is lower than the voltage on the conductor at another setting "Y" of the potentiometer 23. The corresponding changes in the waveforms in FIGS. 3A, 3B, 3C, and 3D between the two settings of the variable resistor for effecting different levels of the lamp intensity are illustrated in these figures. In each figure, the waveform on the left is denoted "setting 'X'" and the waveform on the right in each figure is denoted "setting 'Y'".

The manner in which this control is achieved with potentiometer 23 is as follows:

The peak lamp current always occurs whenever the transistor is turned off, corresponding to times $T_O$ and $T_B$. This occurs whenever the sum of the choke current and lamp current passing through the resistor, denoted 15 in FIG. 1, causes a voltage drop across this resistor equal to the voltage on the conductor, denoted 22 in FIG. 1. As stated above, this occurence causes the comparator amplifier, 20 in FIG. 1, to give a positive output to the multivibrator, which in turn causes the multivibrator to turn the transistor off.

The current passing through the resistor, 15 in FIG. 1, is the collector current of the transistor. This current is plotted in FIG. 3C, as the sum of the lamp current and choke current in region B.

The peak collector current level is equal to the voltage on the conductor 22 in FIG. 1 divided by the resistance of the resistor, 15 in FIG. 1. When the voltage on the conductor 22 is increased or decreased, the collector current peak level will increase or decrease, respectively. Because the decay time of the current between time $T_O$ and time $T_A$ is always the same, the minimum value of the collector current will also increase or decrease, respectively. Thus, the entire waveform of the collector current will be shifted either up or down, respectively, of which two exemplary waveforms are plotted for the two different potentiometer settings "X" and "Y". The waveforms of the choke current and the lamp current will also be shifted up or down, respectively, as shown. This effect is the result of the fact that the collector current through the transistor is the sum of the choke current and lamp current, and the fact that the lamp current is proportional to the choke current.

Thus, it may be seen that the lamp intensity, which is proportional to lamp current, is proportional to the voltage on the conductor 22. By changing the resistance of the potentiometer 23 in FIG. 1, the current supplied to the lamp 11 will change.

The useful life of the gas discharge lamp is increased in this invention since the net DC component of current through the lamp during continued operation is approximately zero. This is achieved by virtue of the parallel inductance which has the property of maintaining a zero DC voltage drop across its terminals. Since this zero DC voltage is also maintained across the lamp, the DC current through the lamp will also be zero.

Although the circuit is particularly suited for use with low intensity, low pressure mercury vapor fluorescent lamps, it can equally well be used to control various other types of gas discharge lamps such as high pressure mercury vapor, high or low pressure sodium, and metal Halide lamps.

DESCRIPTION OF THE FIRST MODIFIED EMBODIMENT

Figure 2:
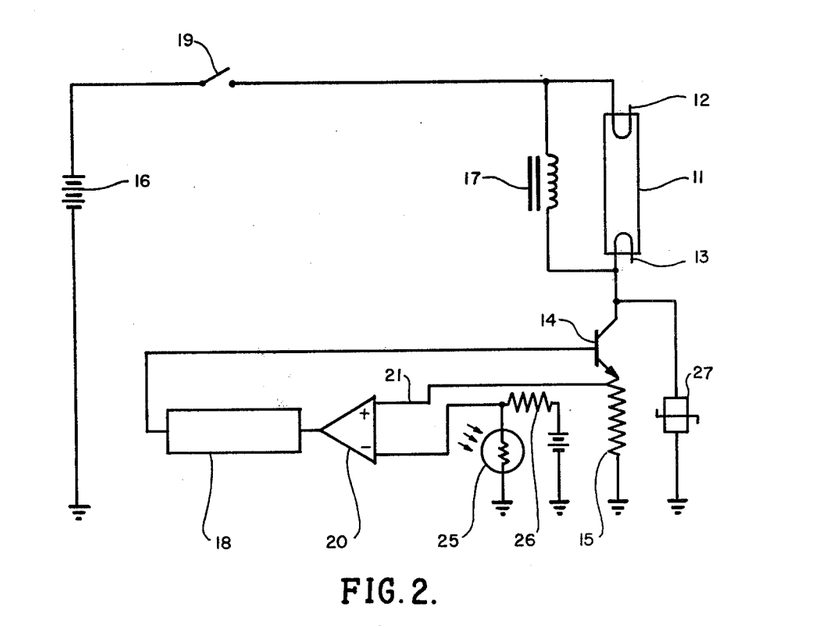
FIG. 2 illustrates a modified form of the circuit of FIG. 1, in which the modification provides for automatically controlling the intensity of the lamp in response to variation in the intensity of the ambient illumination.

FIG. 2 illustrates a modified form of the invention effective to automatically control the intensity of the lamp, causing the intensity of illumination of the lamp 11 to be automatically controlled inversely proportional to the ambient illumination. This circuit is similar to that of FIG. 1 and similar reference numerals are provided for similar components in FIG. 2 and succeeding figures. In lieu of the potentiometer 23 of FIG. 1, a photosensitive resistor 25 or similar photoresistive device is connected in series with resistor 26 between the voltage source 24 and the differential amplifier 20.

Alternatively, and infrared sensing device (not shown) capable of varying its electrical resistance in proportion to the amount of infrared rays intercepted thereby, could be substituted for the photoresistor 25 to detect the presence of a human being in the vicinity of such sensor to cause illumination of the lamp 11 when the human being moves into the area adjacent the lamp.

DESCRIPTION OF THE SECOND MODIFIED EMBODIMENT

Figure 4:
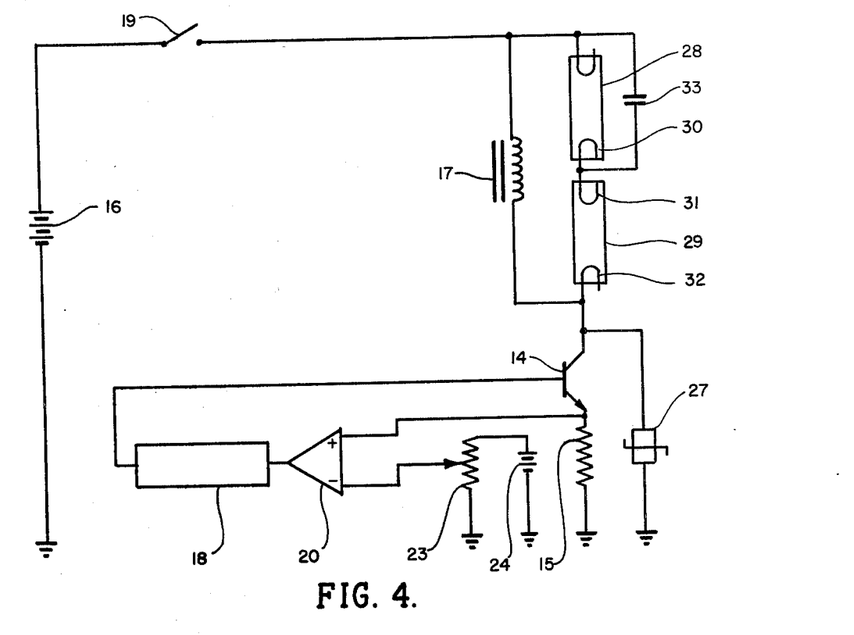
FIG. 4 illustrates another modified form of the invention in which a single control circuit is effective to control a pair of gas discharge lamps connected in series.

FIG. 4 illustrates another modified form of the invention in which two gas discharge lamps 28 and 29 are connected in series with each other in a circuit otherwise similar to that of FIG. 1. Herein, the lamps 28 and 29 are of similar capacity and typically low pressure mercury vapor fluorescent lamps of 22 watts each. The electrode 30 of lamp 28 is connected directly to the electrode 31 of lamp 29. A capacitor 33 is connected across the electrodes 31 and 32 of lamp 29.

When the lamps 28 and 29 are de-energized, they present a relatively high resistance thereacross. Thus, capacitor 33 initially presents a short across lamp 29 at the operating frequency of the circuit, e.g., 20,000 cycles per second. Therefore, when starting, the voltage from inductor 17 is initially applied through the capacitor 33 and across the lamp 28 to ignite the same. After lamp 28 has become ignited, its resistance drops considerably and most of the voltage across inductor 17 now appears across lamp 29, causing it to likewise ignite. The resistance of lamp 29 is relatively small compared to the reactance of capacitor 33 so that the latter has essentially no effect on the circuit during normal operation.

The above arrangement minimizes the breakdown voltage requirement of the transistor switch 14, thereby enabling a relatively small and inexpensive transistor to be used.

DESCRIPTION OF THE THIRD MODIFIED EMBODIMENT

Figure 5:
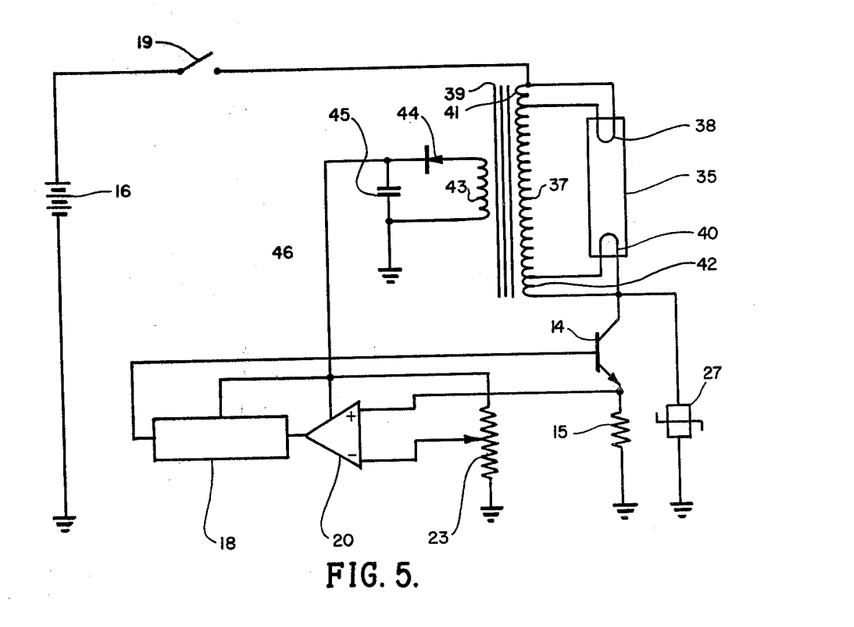
FIG. 5 illustrates another modified form of the invention in which the choke or inductor windings are used as the primary windings of a step-down transformer which supplies power for the one-shot multivibrator and the comparator amplifier as well as the reference voltage to the input of the comparator amplifier.

FIG. 5 illustrates a further modified embodiment of the invention in which a gas discharge lamp 35, typically a low pressure mercury vapor fluorescent lamp of approximately 22 watts, is provided. The electrodes 38 and 40 are of the heated type. Power is derived from a DC voltage source 16.

An inductor 37 is connected in series with the transistor 14 and resistor 15 across the power supply 36. The electrodes 38 and 40 of lamp 35 are tapped into sections 41 and 42 of the winding of inductor 37 to preheat such electrodes prior to ignition of the lamp.

The inductor 37 also acts as the primary winding of a transformer and has an iron core 39 and a step-down secondary winding 43 associated therewith. The winding 43 is connected in circuit with a diode 44 across a capacitor 45. The diode 44 is also connected through line 46 to the power input terminals of the comparator amplifier 20 and multivibrator 18. It is also used to supply the reference voltage to the potentiometer 23.

The sections 41 and 42 of the winding of inductor 37 enable the electrodes 38 and 40 to become heated before the lamp is ignited. This arrangement maximizes electrode life and prevents damage to the electrodes 38 and 40 due to the otherwise excessive rise of temperature at the start of a lamp operation.

The polarity of the winding 43 is preferably such that the capacitor 45 is charged only when the transistor 14 is conducting. This arrangement insures that the particular voltage on capacitor 45 is independent of the variable flyback voltage developed by the inductor 37 when the transistor 14 is cut off.

DESCRIPTION OF THE FOURTH MODIFIED EMBODIMENT

Figure 6:
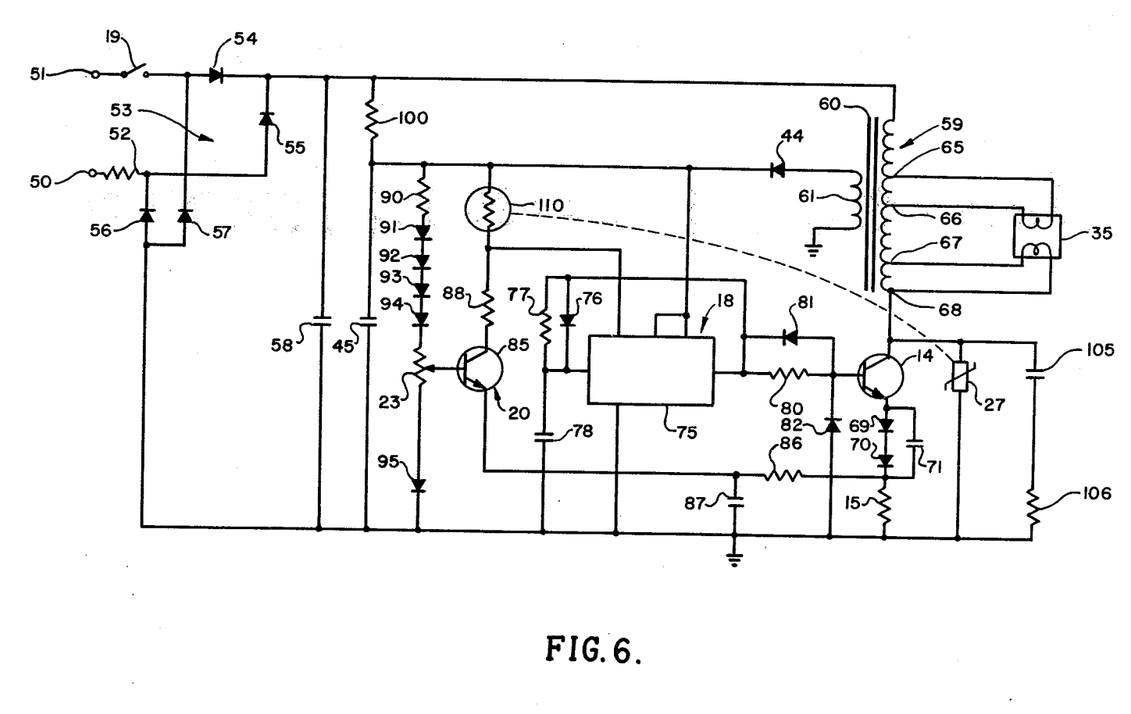
FIG. 6 illustrates a detailed circuit schematic including provision for (a) a step-down voltage supply to the lamp for matching the line voltage to the optimal lamps operating voltage and (b) a thermistor connected between the two inputs to the differential amplifier for sensing the temperature of the varistor device and protecting the varistor and transistor from destructive effects of transient power surges in the circuit.

FIG. 6 illustrates a detailed circuit schematic showing a number of circuit elements which were deleted from the simplified circuits described above to facilitate understanding of the overall operation of the invention. In addition, this figure illustrates several significant additional features of the invention.

The circuit of FIG. 6 is designed to operate from a standard 120 volt AC line connected to terminals 50 and 51. These terminals respectively connect to on-off switch 19 and current limiting resistor 52 to a full wave diode bridge rectifier 53 comprising diodes 54, 55, 56, and 57. The DC output of this rectifier is connected across a wave smoothing capacitor 58. The negative bridge terminal is connected to ground and the positive bridge terminal is connected to one end of an auto-transformer winding 59 having a magnetic core 60, and secondary winding 61.

In the illustration, winding 59 functions as a voltage reducing auto-transformer with one of the lamp electrodes connected to respective mid taps 65 and 66 and the other lamp electrode connected to taps 67 and 68 located at the end of the winding. The purpose of the auto transformer is to match the DC power supply with the optimum voltage characteristic of the lamp. For example, the output of the diode bridge 53 is approximately 168 volts DC with 120 volt AC input. The optimum voltage for a 22 watt fluorescent lamp is, however, typically only 55 volts. Accordingly, the autotransformer winding is selected so that the step down turns ratio is 168 divided by 55. It will be understood that if the optimum lamp operating voltage is larger than the DC power source voltage, a step up autotransformer would advantageously be used to supply the stepped up voltage in the same manner.

The collector of NPN switch transistor 14 is connected to the end terminal 68 of the auto-transformer winding 59. Its emitter is connected through a pair of diodes 69 and 70 and resistor 15 to ground. A capacitor 71 parallels the series connected diodes 69 and 70. Capacitor 71 is charged during steady state operation such that the combination of the capacitor 71 and diodes 69 and 70 back bias the transistor emitter.

Integrated circuit 75, diode 76, resistor 77 and capacitor 78 comprise one shot multivibrator 18. The power supply for this one shot multivibrator is provided by the secondary winding 61, diode 44 and capacitor 45 as described above with reference to the circuit of FIG. 5.

The base of transistor switch 14 is connected to the output of the one shot multivibrator 18 through parallel connected resistor 80 and diode 81. Resistor 80 serves as a base current limiting resistor and shunting diode 81 serves to short out this resistor and provide a low impedance path for the charge stored in transistor 14 when the transistor is turned off. The base is also connected to ground through diode 82.

Comparator amplifier 20 comprises transistor 85 whose emitter is connected to the junction of diode 70 and resistor 15 through an RC filter comprising resistor 86 and capacitor 87. Its base is connected to potentiometer 23 and its collector is connected to the input of one-shot multivibrator 18 through resistor 88.

Potentiometer 23 is connected in series circuit with the resistor 90 and diodes 91, 92, 93, 94 and 95. Resistor 90 reduces the sensitivity of potentiometer 23. Diodes 91 through 94 protect the circuit against transients when the on-off switch 19 is initially closed and diode 95 compensates for the base-emitter drop of comparator transistor 20. As in the embodiment of FIG. 4, the reference voltage for potentiometer 23 is provided by the output of secondary winding 61. The RC filter comprising resistor 86 and capacitor 87 serves to prevent a voltage or current transient from affecting comparator transistor 20 and inadvertently triggering the one-shot multivibrator 18.

A resistive path directly connecting the positive terminal of the diode bridge 53 to the power supply provided by secondary winding 61 is provided by resistor 100. This resistor serves as a current bleeder resistor to provide start up power when the on-off switch 19 is initially closed.

Capacitor 105 and resistor 106 function in parallel with varistor 27 as a snubber protective circuit for protecting the transistor 14 from the inductive auto-transformer load when the transistor is being turned off.

Another significant feature of the circuit of FIG. 6 is the inclusion of thermistor 110 electrically connected between the input of one shot multivibrator 18 and the positive side of the power supply capacitor 45. The thermistor is mechanically and thermally attached to the varistor 27 as indicated by the dotted line. The varistor has a negative temperature coefficient selected such that when a transient surge in the circuit causes the varistor to begin to overheat, the thermistor will become highly conductive and act to hold the input of the one shot multivibrator high, thereby maintaining the transistor 14 in the off state. Thus, the circuit illustrated in FIG. 6 will remain effectively shut down until such time as the varistor 27 has a chance to cool. Accordingly, it will be seen that thermistor 48 prevents overheating of the varistor 27.

An exemplary circuit for operation of a 22 watt fluorescent lamp from 120 volt AC power constructed in accordance with FIG. 6 included the following circuit components:

| | |
|---|---|
| Transistor 14 | MJE 13004 (Motorola) |
| Resistor 15 | 2.2 ohm |
| Potentiometer 23 | 200 ohm |
| Varistor 27 | V275LA 20 (General Electric) |
| Resistor 52 | 1.5 ohm |
| Diodes 54–57 | IN 4003 |
| Capacitor 58 | 100 Micro farad |
| Winding 59 | 263 + 6 + 150 + 6 turns |
| Core 60 | Ferroxcube 376U250-3c8 and 376B250-3c8 |
| Winding 61 | 41 Turns |
| Diodes 69, 70, 76, 81, 82, 91–95 | In4148 |
| Capacitor 71 | 10 Micro farad |
| Integrated Circuit 75 | NE 555 V |
| Resistor 77 | 10K ohm |
| Capacitor 78 | .0033 Micro farad |
| Resistor 80 | 200 ohm |
| Transistor 85 | 2N 3904 |
| Resistor 86 | 22 ohm |
| Capacitor 87 | .1 Micro farad |
| Resistor 90 | 1.3K ohm |
| Resistor 100 | 20K ohm |
| Capacitor 105 | 560 pico farad |
| Resistor 106 | 220 ohm |
| Thermistor 110 | 4C5002 (Western Thermistor) |

We claim:

1. A circuit for energizing a gas discharge lamp comprising:
   first means for storing magnetic energy connected in parallel combination with the electrodes of the gas discharge lamp;
   second means for connecting a power supply to said parallel combination to provide a current flow in a first direction through said lamp; and
   third means operatively coupled to said second means for interrupting the connection between said power supply and said parallel combination for a predetermined length of time whenever the current through said parallel combination has increased to a predetermined level so that the current through said lamp is reversed to flow in a second, opposite direction for said predetermined length of time.

2. The circuit of claim 1 including means for varying said predetermined level of current for varying the intensity of the lamp.

3. The circuit of claim 2 wherein said means for varying said predetermined level of current comprises a potentiometer connected to a reference voltage source.

4. The circuit of claim 2 wherein the predetermined level of current passing through said parallel combination is automatically varied as a function of the intensity of ambient illumination.

5. The circuit of claim 1 comprising means for protecting said second means against excessive voltages if said lamp is removed or fails and becomes an open circuit.

6. The circuit of claim 1 comprising means for preheating the electrodes of the gas discharge lamp prior to ignition.

7. The circuit of claim 1 wherein there is zero DC current through the electrodes of said gas discharge lamp.

8. The circuit of claim 1 comprising protective means connected to said first means for preventing said first means from producing a deleterious high voltage across said third means when there is an open circuit condition across said first means.

9. The circuit of claim 8 wherein said open circuit condition is caused by removal of said gas discharge lamp or by a defective discharge lamp.

10. The circuit of claim 1 comprising protective means connected to said first means and said third means for both (a) protecting said third means from transient surges in power in the circuit, and (b) preventing the lamp electrodes from undergoing a very rapid rate of change of temperature.

11. The circuit of claim 1 comprising first protective means for protecting said third means from transient surges in power in the circuit and second protective means for preventing overheating of said first protective means from overheating.

12. The circuit of claim 11 wherein said current through said lamp oscillates at a frequency of the order of 20,000 to 40,000 Hz.

13. The circuit of claim 1 comprising means controlling more than one gas discharge lamp such that the required voltage supplied to the lamps by the circuit to ignite the lamps is not increased above the voltage required in the circuit to ignite one of said gas discharge lamps.

14. The circuit of claim 1 wherein current flows from said power supply through said lamp in one direction when said switching means is on and flows from said means for storing magnetic energy through said lamp in the opposite direction when said switching means interrupts the connection between said power supply and said parallel combination.

15. The circuit of claim 1 including an auto-transformer having the dual functions of said first means and providing a step up or step down voltage to said lamp.

16. The circuit of claim 1 wherein said first means comprises a transformer having a secondary winding thereon for supplying power to said third means.

17. Apparatus for energizing a gas discharge lamp having a pair of electrodes which comprises:
a voltage supply circuit;
a switching device;
a resistor;
means connecting said electrodes, said switching device and said resistor in series across said supply circuit;
an inductor connected in parallel with said electrodes;
a one-shot multivibrator having a first fixed time output state and a second variable time output state;
means connecting the output of said multivibrator to said switching device to close said switching device during said first output state and to open said switching device during said second output state; and
means responsive to a rise in voltage across said resistor for triggering said multivibrator to said second state.

18. Apparatus as defined in claim 17 wherein said lamp has a predetermined ionization time period and wherein the time period of said first state is less than said ionization time period.

19. Apparatus as defined in claim 17 wherein said switching device comprises a transistor.

20. Apparatus as defined in claim 17 comprising:
a source of reference voltage; and
means for comparing said rise in voltage and said reference voltage and for triggering said one-shot multivibrator to said first state when said rise in voltage reaches the level of said reference voltage.

21. Apparatus as defined in claim 20 comprising:
means for variably adjusting said reference voltage.

22. Apparatus as defined in claim 21 wherein said variable adjustable means comprises a potentiometer.

23. Apparatus as defined in claim 21 wherein said variable adjusting means comprises:
a light sensing device; and
means controlled by said sensing device for controlling said reference voltage.

24. Apparatus as defined in claim 17 comprising:
a second gas discharge lamp having a pair of electrodes;
means connecting said lamps in series;
means connecting said inductor in parallel with said two lamps; and
a capacitor connected in parallel with one of said lamps so that said capacitor shorts said one of said lamps until the other of said lamps is ignited.

25. Apparatus as defined in claim 17 wherein said inductor is a transformer having a primary winding and a secondary winding, said primary winding being connected in parallel with said electrodes whereby to form said inductor, and means connecting said secondary winding as a power supply for said multivibrator.

26. Apparatus as defined in claim 25 comprising:
additional windings connected in circuit with said primary winding; and
means connecting said additional windings in circuit with respective ones of said electrodes whereby to heat said electrodes prior to energization of said lamp.

27. Apparatus as defined in claim 17 comprising:
a voltage clamping device connected in parallel with said switching device and said resistor; and
said clamping device having a breakdown voltage less than the breakdown voltage of said switching device.

28. Apparatus as defined in claim 27 wherein said clamping device comprises a metal oxide varistor.

29. Apparatus as defined in claim 27 comprising:
means for sensing the temperature of said clamping device and for operatively coupled to said multivibrator to maintain said switching device open when said clamping device exceeds a predetermined temperature.

30. Apparatus as defined in claim 29 wherein said temperature sensing means is a thermistor.

* * * * *